United States Patent
Wilkof et al.

(10) Patent No.: US 9,616,834 B2
(45) Date of Patent: *Apr. 11, 2017

(54) APPARATUS AND METHOD FOR PRESERVING SPACING AROUND A VEHICLE

(71) Applicant: JJR Innovations, Inc., Bethesda, MD (US)

(72) Inventors: Jared Wilkof, Chevy Chase, MD (US); John Kazeva, Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/747,319

(22) Filed: Jun. 23, 2015

(65) Prior Publication Data
US 2015/0283966 A1 Oct. 8, 2015

Related U.S. Application Data

(63) Continuation of application No. 13/755,268, filed on Jan. 31, 2013, now Pat. No. 9,079,543.

(51) Int. Cl.
B60R 19/38 (2006.01)
B60R 19/00 (2006.01)
B60R 9/00 (2006.01)
B60R 19/48 (2006.01)

(52) U.S. Cl.
CPC ............ B60R 19/38 (2013.01); B60R 9/00 (2013.01); B60R 19/00 (2013.01); B60R 19/483 (2013.01)

(58) Field of Classification Search
CPC ....... B60R 19/38; B60R 19/00; B60R 19/483; B60R 9/00
USPC .......................................................... 701/45
See application file for complete search history.

(56) References Cited

U.S. PATENT DOCUMENTS

| 2,134,108 | A | 10/1938 | Drude |
| 3,134,619 | A | 5/1964 | Harrison |
| 3,588,160 | A | 6/1971 | Reiner |
| 3,608,943 | A | 9/1971 | Gostomski |
| 5,005,887 | A | 4/1991 | Kelman |
| 7,210,718 | B1 | 5/2007 | Budhu |
| 7,832,779 | B2 | 11/2010 | Rosemeyer |
| 7,921,952 | B2 | 4/2011 | Tseng et al. |
| 7,938,476 | B2 | 5/2011 | Braunbeck et al. |
| 7,950,705 | B2 | 5/2011 | Saitou |
| 7,954,863 | B2 | 6/2011 | Ahlin |

(Continued)

FOREIGN PATENT DOCUMENTS

GB 2441316 B 10/2011

Primary Examiner — Mussa A Shaawat
Assistant Examiner — Nadeem Odeh
(74) Attorney, Agent, or Firm — Hauptman Ham, LLP

(57) ABSTRACT

An apparatus for preserving spacing around a vehicle includes a load bearing member and a controller. The load bearing member has a first end portion and a second end portion opposite the first end portion. At least the first end portion of the load bearing member is movable to a predetermined position within a range that includes a fully retracted position and a fully extended position. The controller is configured to cause, for a parking operation, the first end portion of the load bearing member to be moved to the predetermined position based on a received instruction indicative of a preset parking scenario stored in a memory. For the parking operation, the predetermined position is one of a first preset position stored in the memory for a first parking scenario or a second preset position stored in the memory for a second parking scenario different from the first parking scenario.

20 Claims, 9 Drawing Sheets

(56) References Cited

U.S. PATENT DOCUMENTS

| | | |
|---|---|---|
| 7,992,926 B2 | 8/2011 | Tamakoshi |
| 8,038,186 B2 | 10/2011 | Roth |
| 8,118,346 B2 | 2/2012 | Ginja et al. |
| 2006/0170180 A1 | 8/2006 | Collins |
| 2007/0205617 A1 | 9/2007 | Hahn et al. |
| 2007/0290515 A1 | 12/2007 | Doan |

APPARATUS AND METHOD FOR PRESERVING SPACING AROUND A VEHICLE

PRIORITY CLAIM

The present application is a continuation of U.S. application Ser. No. 13/755,268, filed Jan. 31, 2013, which is incorporated herein by reference in its entirety.

BACKGROUND

Manufacturers and service providers are continually challenged to deliver value and convenience to consumers. Various vehicles such as automobiles are often left stationary in locations that that invite other vehicles or objects to encroach on the stationary vehicle. Such an encroachment may damage and/or immobilize the stationary vehicle.

SUMMARY

An aspect of this description is related to an apparatus for preserving spacing around a vehicle. The apparatus comprises a load bearing member having a first end portion and a second end portion opposite the first end portion. At least the first end portion of the load bearing member is movable to a predetermined position within a range that includes a fully retracted position and a fully extended position. The apparatus also comprises a controller configured to cause, for a parking operation, the first end portion of the load bearing member to be moved to the predetermined position based on a received instruction indicative of a preset parking scenario stored in a memory. For the parking operation, the predetermined position is one of a first preset position stored in the memory for a first parking scenario or a second preset position stored in the memory for a second parking scenario different from the first parking scenario. At least one of the first preset position or the second preset position is different from the fully extended position and the fully retracted position. The controller, for the parking operation, is configured to cause the first end portion of the load bearing member to be moved to the first preset position or the second preset position based on the instruction.

Another aspect of this description is related to an apparatus for preserving spacing around a vehicle. The apparatus comprises a processor and a memory comprising computer executable instructions that, when executed by the processor, cause the apparatus to cause, for a parking operation, a first end portion of a load bearing member to be moved to a predetermined position based on a received instruction indicative of a preset parking scenario stored in the memory. For the parking operation, the predetermined position is one of a first preset position stored in the memory for a first parking scenario or a second preset position stored in the memory for a second parking scenario different from the first parking scenario. At least one of the first preset position or the second preset position is different from at least one of a fully extended position of the first end portion of the load bearing memory or a fully retracted position of the first end portion of the load bearing member.

A further aspect of this description is related to a method of preserving spacing around a vehicle. The method comprises causing, by a processor, in response to a received first instruction indicative of a preset parking scenario stored in a memory, a load bearing member having a first end portion and a second end portion distal the first end portion to be moved to a predetermined position within a range that includes a fully retracted position and a fully extended position. The predetermined position is one of a first preset position stored in the memory for a first parking scenario or a second preset position stored in the memory for a second parking scenario different from the first parking scenario. At least one of the first preset position or the second preset position is different from the fully extended position and the fully retracted position. The first end portion of the load bearing member is caused to be moved to the first preset position or the second preset position based on the first instruction.

Exemplary embodiments are described herein. It is envisioned, however, that any system that incorporates features of any apparatus, method and/or system described herein are encompassed by the scope and spirit of the exemplary embodiments.

BRIEF DESCRIPTION OF THE DRAWINGS

The embodiments of the invention are illustrated by way of example, and not by way of limitation, in the figures of the accompanying drawings.

DETAILED DESCRIPTION

Examples of an apparatus and method for preserving spacing around a vehicle are disclosed. In the following description, for the purposes of explanation, numerous specific details are set forth in order to provide a thorough understanding of the embodiments of the invention. It is apparent, however, to one skilled in the art that the embodiments may be practiced without these specific details or with an equivalent arrangement. In other instances, well-known structures and devices are shown in block diagram form in order to avoid unnecessarily obscuring the embodiments.

Figure 1:
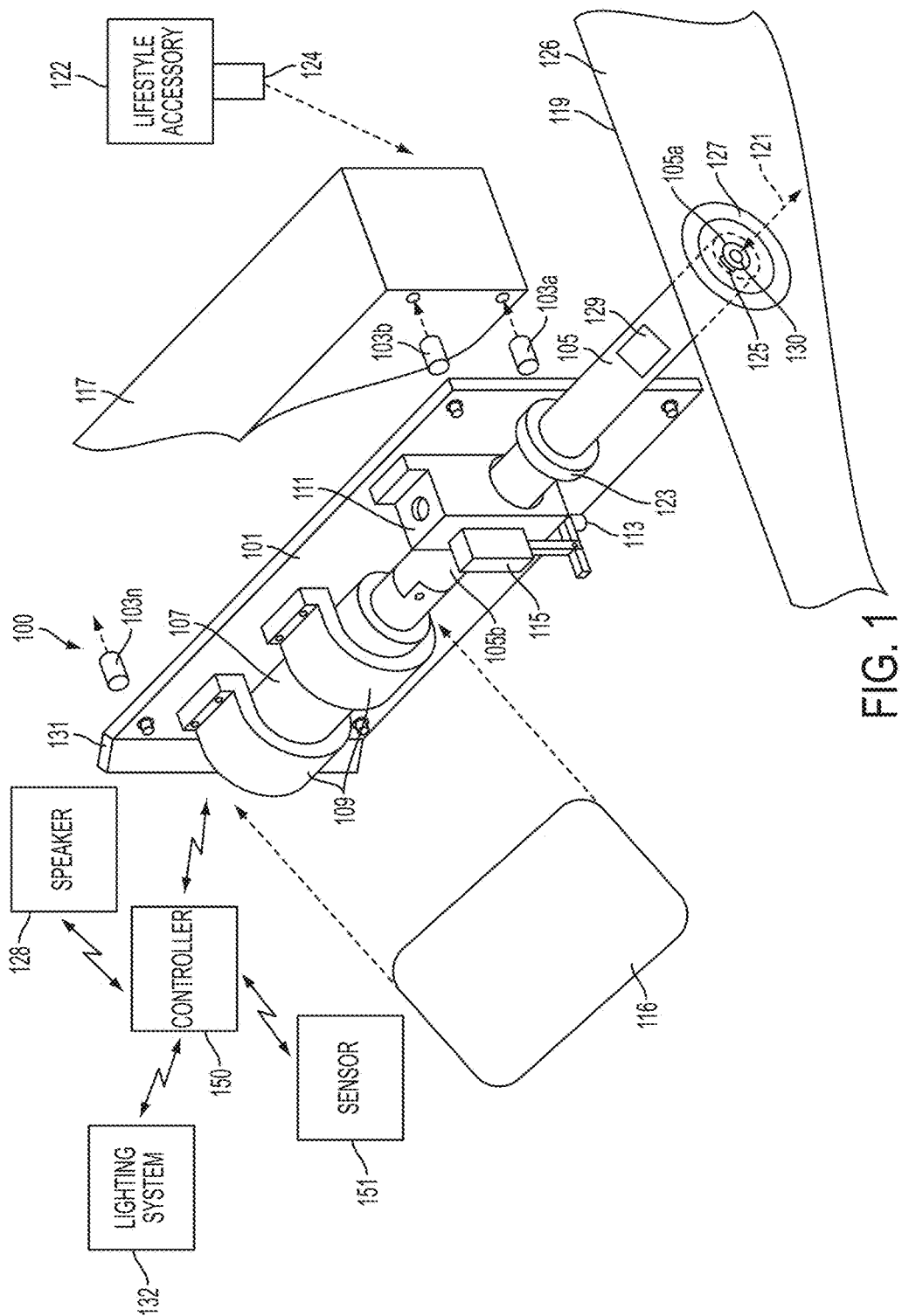
FIG. 1 is a diagram of a system capable of preserving spacing around a vehicle, according to one example embodiment.

FIG. 1 is a diagram of a system capable of preserving spacing around a vehicle, according to one embodiment. Various vehicles such as automobiles are often left stationary or parked in locations that that invite other vehicles or objects to encroach on the stationary vehicle. Such an encroachment may damage and/or immobilize the stationary vehicle.

For example, vehicles are often left in a stationary position on a street, in a parking lot, in a garage, etc., such that one or more other vehicles may be left stationary or parked next to, in front of, or behind the stationary vehicle. When moving into a very close position from any direction, an encroaching vehicle may accidentally, or intentionally, contact the stationary vehicle. Such contact may damage the stationary vehicle which can be aggravating, as well as time consuming and costly to repair.

Considering a scenario in which a series of vehicles are aligned in a head-to-tail manner by way of parallel parking or other means, not only might an encroaching vehicle contact an already parked vehicle, but once parked, the encroaching vehicle might be parked very close to or in contact with the already parked vehicle. In such a situation, vehicle operators often find that their vehicles are "boxed" in and cannot be moved at all. Alternatively, the one or more other vehicles are so close to the operator's vehicle that that vehicle cannot be safely moved from its stationary position without causing damage the operator's vehicle and/or any of the one or more other vehicles.

Similarly, if one or more vehicles are left stationary in a side-by-side arrangement, vehicular doors may be inoperable because there is not enough clearance between the stationary vehicles. Or, when an operator or passenger exits a vehicle that has encroached on the stationary vehicle, the exiting party may cause a door of their vehicle to contact the stationary vehicle. Such contact may also damage the stationary vehicle.

In either case, inadvertent and unexpected damage to a vehicle can be inconvenient, aggravating, time consuming, and costly. Additionally, if a stationary vehicle cannot be moved from its stationary position, unless one or more other vehicles that are parked around it are moved first, it is not uncommon to receive a costly parking fine that could otherwise have been avoided had a vehicle operator been able to move the vehicle from its stationary position.

Vehicle operators often transport or use various lifestyle accessories such as bicycle racks, grills, chairs, couches, tents, storage containers, coolers, etc., when traveling or participating in a tailgating party, for example. Many of these lifestyle accessories are incompatible when it comes to transport and/or use. For example, if two types of lifestyle accessories can only be transported in the same way such as by using a roof-rack, then it may be inconvenient or impossible to transport both of those lifestyle accessories without attempting to do so unsafely. Similarly, some vehicle operators introduce safety hazards when attempting to transport and/or use some lifestyle accessories by, for example, ineffectively securing a lifestyle accessory to any portion of a vehicle or by using a trailer to haul one or more accessories on any given occasion. Additionally, attempting to find a bike rack or storage container that is compatible with a particular vehicle type and/or brand can be a costly and time-consuming exercise.

To address these problems, a system 100 of FIG. 1 introduces the capability to preserve spacing around a vehicle and/or accommodate one or more lifestyle accessories. The system 100 ensures that a stationary vehicle retains an adequate spacing between itself and any other vehicles that may encroach and/or park at least in front of or behind the stationary vehicle. The system 100, alone or in combination with one or more other system 100's, is configured to preserve adequate spacing between vehicles by moving one or more portions of one or more load bearing members to a predetermined position other than a fully retracted position. The one or more load bearing members are configured to extend outward from one or more of a forward portion, rearward portion, side portion, top portion, or bottom portion of a vehicle, depending on a particular implementation of the system 100.

To ensure ease of egress of the stationary vehicle from its stationary position, the system 100 retracts the one or more load bearing members to regain maneuvering ability in the preserved spacing between the stationary vehicle and the one or more other vehicles that may be adjacent to the stationary vehicle. In embodiments, these protruding load bearing members also provide protection to the stationary vehicle's bumpers, side panels, and/or any other body panels to prevent marring from contact by any encroaching vehicles or objects.

The system 100 may also serve as a means for accommodating one or more lifestyle accessories by enabling optional attachment of one or more lifestyle accessories and/or enabling one or more lifestyle accessory supports to be attached to and supported by any combination of the one or more load bearing members when at least portions of such load bearing members are extended to a predetermined position from a fully retracted position.

As shown in FIG. 1, the system 100 comprises a mounting member 101, one or more couplings 103a-103n (collectively referred to as coupling 103), a load bearing member 105, a load bearing member actuator 107, one or more support brackets 109 that may or may not include a shear member support bracket 111, a shear member 113, and a shear member actuator 115.

According to various embodiments, the mounting member 101 may be any combination of a base plate, series of plates, clamps, kits, etc., to which the one or more support brackets 109 and/or the shear member support bracket 111 may be attached. Alternatively, the mounting member 101 may be unitarily formed with any combination of the one or more support brackets 109 and/or the shear member support bracket 111. In one or more embodiments, the mounting member 101, support brackets 109, and shear member support bracket 111 comprise any combination of metals, polymers, carbon fiber, or other material capable of supporting any other components of the system 100.

In some embodiments, the support brackets 109 are configured to support any combination of the load bearing member 105 and/or the load bearing member actuator 107. Alternatively, the load bearing member actuator 107 may itself be configured to be attached to the mounting member without a support bracket 109. The illustrated support brackets 109 may be varied in geometry so as to encapsulate the load bearing member actuator 107 in a weather-resistant covering. Alternatively, the system 100 may additionally include a cover 116 for at least the load bearing member actuator 107 that is either on an inside portion or an outside portion of any support bracket 109 to protect the load bearing member actuator 107 from any detrimental environmental effects.

If configured to be separately attached, the support brackets 109 may be configured to accommodate a lesser load than the shear member support bracket 111 because, as discussed in more detail below, the support brackets 109 may be positioned on the mounting member 101 such that they are isolated from a direct impact load that is applied to the load bearing member 105. If isolated from such a load, the support brackets 109 and any fastener by which they are attached to the mounting member 101 need only be capable of withstanding reaction loads that occur during the load bearing member actuator 107 operation. But in some embodiments, the support brackets 109 may be configured to handle any extensive load beyond the minimum discussed above that may be applied to the support brackets 109 and/or any corresponding fasteners to accommodate a particular implementation, marketability purposes, or ease of manufacture.

According to various embodiments, the mounting member 101 is configured to be attached or mounted directly or indirectly to a vehicular frame 117 using one or more of the couplings 103. The vehicular frame 117 may be any vehicle frame component of any type of vehicle such as, but not limited to, ground vehicles such as automobiles, motorcycles, and the like, nautical vehicles such as, but not limited to, boats, personal watercraft, and the like, aeronautical vehicles such as airplanes, helicopters, etc., or any combination or variation thereof. A vehicular frame 117 may be exposed to an outer environment or it may be shielded at least partially from an outer environment by one or more vehicular external elements 119 such as, but not limited to, a vehicular bumper, side-panel, quarter-panel, fender, hood, hull, roof panel, fairing, etc.

In one or more embodiments, the load bearing member 105 may be any combination of single-piece, solid, hollow, telescoping, or otherwise multi-piece rods, beams, or other components that comprise any combination of materials including, but not limited to, metals such as steel, stainless steel, titanium, aluminum, various alloys, polymers, rubbers, ceramics, carbon fibers, etc.

The load bearing member 105 has a first end portion 105a and a second end portion 105b distal the first end portion 105a. As discussed in more detail below and illustrated in FIG. 2, the load bearing member 105 is operatively coupled to the load bearing member actuator 105 and may be controlled such that at least the first end portion 105a is moved to a predetermined position which may be any position including a fully retracted position, a fully extended position, or any position in between in a direction 121 on demand by the load bearing member actuator 107.

The first end portion 105a of the load bearing member 105 may be deployed to a predetermined position other than the fully retracted position for any reason such as, but not limited to, preserving spacing around a stationary vehicle to which the system 100 is attached, to facilitate attaching one or more lifestyle accessories 122 to the load bearing member 105, enable attachment or deployment of one or more airflow control members, or simply to provide protection for the stationary vehicle from any potential encroaching vehicles or objects. Similarly, the first end portion 105a may be deployed during a parking operation to protect the vehicle to which the system 100 is attached from an encroaching or stationary object while the vehicle is in motion such as another vehicle, a wall, a shopping cart, a support beam, etc.

The predetermined position to which the first end portion 105a of the load bearing member 105 may be moved, if it is other than the fully retracted position, may be any position preset to correspond with a specific preset function of the system 100 or determined on demand based on a received instruction. For example, the predetermined position may be preset for a particular parking scenario such as parallel parking. The predetermined position may be the same or different for a different parking scenario such as parking a vehicle in a shopping center parking space, or sitting stationary but not officially parked. The predetermined position may be based on a particular use of the system 100 such as a position that corresponds to a particular type of lifestyle accessory 122 or an amount the first end portion 105a should be deployed from the fully retracted position while the vehicle is in motion. Alternatively, the predetermined position may be set on the fly, such as based on a received instruction from a user input or based on a determined available spacing for deploying the first end portion 105a of the load bearing member 105 from the fully retracted position.

In turn, the first end portion 105a may be moved to a predetermined position that is the fully retracted position, or retracted to a predetermined position closer to the fully retracted position than an initial deployment position, for any reason such as, but not limited to, promoting ease of egress of a vehicle to which the system 100 is attached from a stationary position or upon removal of the one or more lifestyle accessories 122 from the load bearing member 105.

In the embodiment illustrated in FIG. 1, the system 100, regardless of whether the mounting member 101 is configured to be directly or indirectly attached to the vehicular frame 117, is configured to move at least a portion of the load bearing member 105 through a cooperating vehicular external element 119 having an opening 127. In other embodiments, the system 100 may include a mounting member 101 that is configured to cantilever at least the load bearing member 105, or the mounting member 101 may be configured to cooperate with an adapter kit that facilitates indirect attachment to the vehicular frame 117. Such a case may be beneficial, for example, if a cooperating vehicular external element is not available and accordingly lacks a through-hole such as opening 127 through which a portion of the load bearing member 105 may move. A cantilevered or indirectly attached mounting member 101, in some embodiments, facilitates movement of the first end portions 105a to the predetermined position while avoiding contact with the vehicular external element 119.

In one or more embodiments, the first end portion 105a may be configured to be fully retracted to a position such that the first end portion 105a is flush with an external plane or surface 126 of the vehicular external element 119 so as to blend in with an external plane or surface 126 of the vehicular external element 119, providing aesthetic appeal and hide-away functionality. Alternatively, the first end portion 105a may be configured to be retracted to a position between the vehicular frame 117 and an external plane or surface 126 of the vehicular external element 119 in the direction 121 (i.e., recessed). In such an embodiment, the vehicular external element 119 may be configured to include a closable cover, or the system 100 may include a cover portion to at least partially seal the opening 127 upon moving the first end portion 105a to the fully retracted position. Or, for example, the first end portion 105a may be configured to be retracted only to a position that is beyond the external plane or surface 126 of the vehicular external element 119 along the direction 121.

In some embodiments, the load bearing member 105 may be configured to include a bumper portion 125. The bumper portion 125 may be any of an end cap or attachment to the first end portion 105a that comprises a soft polymer—for example, a coating that is applied to the first end portion 105a, or a portion of the first end portion 105a impregnated with one or more materials to make the first end portion 105a of the load bearing member 105 non-marking to prevent or limit any damage the first end portion 105a of the load bearing member 105 may cause to an encroaching vehicle or object. In various embodiments, the bumper portion 125 may also include a shock-absorbing portion, such as, but not limited to a spring, foam, rubber or polymer.

Alternatively, the bumper portion 125 may be an end cap or attachment that is rigid and not non-marking. The bumper portion 125 may take on any geometry, such as the end cap discussed above, an exposed end portion of the first end portion 105a of the load bearing member 105, a cantilevered beam extending from the first end portion 105a of the load bearing member 105, a plow, a brush guard, etc., that, depending on geometry, could retract to a position between the vehicular frame 117 and the external plane or surface 126 of the vehicular external element 119, retract to a position that is flush with the external plane or surface 126 of the vehicular external element 119, or extend beyond the external plane or surface 126 of the vehicular external element 119.

In one or more embodiments, the first end portion 105a may be configured to be moved to a predetermined position, such as a fully retracted position, a fully extended position, or any position therebetween on demand by the load bearing member actuator 107. The fully extended position of the first end portion 105a of the load bearing member 105 may be limited by any of physical constraints, implementation or usage based instruction constraints, any system instructed safety constraints, etc. As such, the fully extended position of the first end portion 105a could be set to be anywhere in a range between 1 inch outward from the external plane or surface 126 of the vehicular external element 119, for example, for protective purposes, up to 36 inches for space saving and/or for lifestyle attachment purposes. It should be understood, however, that the fully extendable length limit of the first end portion 105a of the load bearing member 105 may be set to be any distance from the fully retracted position based, at least in part, on the various load limits that the load bearing member 105, the mounting member 101, the couplings 103, and/or the support brackets 109/111 can accommodate.

For purposes of space saving to ease egress from a stationary position, the predetermined position may be anywhere between 4 and 12 inches from the external plane or surface 126 of the vehicular external element 119. Most vehicle operators, however, need at least 6 inches to safely move their vehicle out of a stationary position when surrounded by other vehicles or objects. As such, to simplify the system 100, the fully extended position could be set at 6 inches so save weight and material costs, for example. But, as discussed above, the fully extended position could be any distance from the external plane or surface 126 of the vehicular external element 119, or any distance from the fully retracted position without relation to a vehicular external element 119. For example, if a vehicle does not have a vehicular external element 119, or the system 100 is not in a situation in which it cooperates with a vehicular external element 119, then the fully extended position of the first end portion 105a of the load bearing member could be determined as a relative distance in relation to the fully retracted position.

While the first end portion 105a could be selected to be moved to any position between and including the fully retracted position and the fully extended position on demand, in some embodiments, however, the first end portion 105a may be fixed to be moved only between the fully extended position and the fully retracted position. Such limitations may be imposed as a cost saving measure, for example, to reduce the complexity of the load bearing member actuator 107, and/or the system 100 as a whole.

According the various embodiments, the load bearing member actuator 107 may be any of an electro-mechanical driver such as, but not limited to, a linear actuator, motor-driven screw, stepper motor, solenoid actuator, hydraulic actuator, pneumatic actuator, manual hand-crank actuator, or any combination thereof, configured to directly or indirectly control movement of the first end portion 105a of the load bearing member. Some embodiments, for example, may include an electro-mechanical driver and a manual hand-crank option to provide a back-up in case of mechanical or electrical failure so that the first end portion 105a of the load bearing member 105 may still be moved to the predetermined position on demand regardless of whether the electro-mechanical actuator is functional. Or, the load bearing member actuator 107 may simply be a manual actuator to reduce system 100 complexity and costs.

In some embodiments, as a safety measure, the system 100 may include a shear member 113, as discussed above. Upon causing the first end portion 105a of the load bearing member 105 to reach a predetermined position that is other than the fully retracted position, or at least in the fully extended position, the shear member 113 may be driven by the shear member actuator 115 into a shear member receiving portion included in the load bearing member 105. The shear member receiving portion (see FIG. 3), for example, may be a through-hole positioned in the load bearing member between the first end portion 105a and the second end portion 105b. The shear member 113, in some embodiments, may be, for example, a pin or rod of any shape in its cross-section that is inserted in a direction that is about perpendicular to the direction 121. The approximately perpendicular direction with respect to the direction 121 may be any of vertical or horizontal with respect to a ground plane, for example. But, it should be noted that the shear member 113 could be inserted into the shear member receiving portion in any direction, including angles that are greater than 0 degrees and less than 90 degrees with respect to the direction 121.

In one or more embodiments, the shear member 113 comprises one or more components comprising any combination of materials including, but not limited to, metals such as steel, stainless steel, titanium, aluminum, various alloys, polymers, rubbers, ceramics, carbon fibers, etc.

The shear member 113 and the shear member actuator 115 are supported by the shear member support bracket 111. The shear member support bracket 111 is configured to be attached to or integrally formed with the mounting member 101. The shear member support bracket 111 comprises one or more components comprising any combination of materials including, but not limited to, metals such as steel, stainless steel, titanium, aluminum, various alloys, polymers, rubbers, ceramics, carbon fibers, etc. The shear member support bracket 111 may be of a same or different material than at least the mounting member 101, the shear member 113, or any other support bracket 109, for example.

When in an engaged position inside the shear member receiving portion included in the load bearing member 105, the shear member 113 isolates the load bearing member actuator 107 from any impingement and/or impact loads that may be imposed on the first end portion 105a of the load bearing member 105. For example, if a load is applied to the first end portion 105a of the load bearing member by an external force such as an encroaching vehicle or object, the shear member 113 is configured to divert the force from applied to the first end portion 105a of the load bearing member 105 through the shear member 113, the shear member support bracket 111, the mounting member 101 and accordingly to the couplings 103 and the vehicular frame 117. Such diversion of force protects the load bearing member actuator 107 from damage and may also optionally limit any necessary high strength elements of the system 100 to only the load bearing member 105, the shear member 113 and the shear member support bracket 111, for example.

Similar to the load bearing member actuator 107, the shear member actuator 115 may be any of an electromechanical driver such as, but not limited to, a linear actuator, motor-driven screw, stepper motor, solenoid actuator, hydraulic actuator, pneumatic actuator, manual hand-crank actuator, or any combination thereof, optionally in conjunction with a direction reversing linkage (see FIG. 4), depending on placement of shear member actuator 115 such as adjacent to, or atop of, the shear member support bracket 111.

According to various embodiments, the system 100 may also include a collar 123 that is any of attached, positioned around, or integrally formed with the load bearing member 105 between the first end portion 105*a* and the second end portion 105*b* of the load bearing member 105. The collar 123 may comprise any number of components that comprise any materials that are the same or different from the materials of the load bearing member 105. Though illustrated as having a circumference for simplicity, the collar 123 may be any shape or size.

As an additional or alternative safety feature, the collar 123 is configured to interact, for example, via an impact or pressing action, with any of the support brackets 109 and/or the shear member support bracket 111 at least when the first end portion 105*a* of the load bearing member 105 is in the fully retracted position, or when the shear member 113 is not engaged in the shear member receiving portion. The collar 123, like the shear member 113, is configured to divert a force applied to the first end portion 105*a* of the load bearing member 105 through a support bracket 109 or the shear member support bracket 111, the mounting member 101, and accordingly, to the couplings 103 and the vehicular frame 117. Such diversion of force protects the load bearing member actuator 107 from damage and may also optionally limit any necessary high strength elements of the system 100 to only the load bearing member 105, the shear member 113, and the shear member support bracket 111, for example.

In one or more embodiments, the load bearing member 105 is at least configured to withstand a compressing impact force applied in the direction 121 by a standard encroaching motor vehicle weighing approximately 5,500 lbs traveling at 2 mph without plastic deformation to the load bearing member 105. In other words, the load bearing member 105 is at least configured to withstand an impact force of up to about 5,000 lbf to the first end portion 105*a* of the load bearing member without experiencing plastic deformation. In other embodiments, the load bearing member 105 may be configured to withstand an impact force of any value up to about 15,000 lbf without plastic deformation, which would more than accommodate for an impact load resulting from a standard encroaching motor vehicle weighing approximately 5,000 lbs and traveling at 5 mph. The maximum impact force load that the load bearing member 105 can accommodate may be selected depending on a particular implementation of the system 100 and is dependent on the material selection, geometry, extension length of the load bearing member 105 and any desired safety factor.

For example, because the maximum impact force load that the load bearing member 105 can accommodate in the direction 121 without plastic deformation is based, at least in part, on the geometry of the load bearing member 105, the load bearing member 105 may include one or more rod or telescoping portions that may be any combination of circular, triangular, rectangular, square, octagonal, hexagonal, or any other polygonal shape in its cross section. Additionally, any or all portions of the load bearing member 105 may be hollow or solid in its cross-section. In some embodiments, however, the load bearing member 105 may comprise one or more linkages that facilitate movement of the first end portion 105*a* of the load bearing member 105. Similarly, the load bearing member 105 may be any length depending on its intended application. The length, material, and cross-sectional geometry of the load bearing member 105 may be varied in one or more embodiments depending on application so that the load bearing member 105 is configured to withstand any reasonably expected impact force load without plastic deformation within a desired safety factor.

In some embodiments, as an additional or alternative safety feature to those discussed above, the couplings 103 may be configured to fail or break-away upon a particular load threshold being exceeded. For example, a load threshold may relate to any of an impact load or static load applied to the first end portion 105*a*, or any other portion of the load bearing member 105. Such a load threshold limit may be configured to protect the vehicular frame 117 and/or any other vehicular elements or occupants from experiencing damage or injury that may be attributed to the load applied to the load bearing member 105. For example, many conventional motor vehicle today are configured to deploy a safety airbag based on an impact caused by a standard motor vehicle approaching at about 14 mph which is about 35,000 lbf.

Accordingly, in some embodiments, the load threshold limit may be set to be is greater than or equal to about 25,000 lbf so that the system 100 is caused to break away from the vehicular frame when the first end portion 105*a* is subjected to an impact load that is less than the current vehicle safety standards. Accordingly, any force subjected to the first end portion 105*a* that is above the load threshold limit would not be entirely transferred to the vehicular frame 117 and/or any vehicle occupants to which the system 100 is attached. In other embodiments, the load threshold limit may be set to be about 35,000 lbf to approximately comply with conventional airbag deployment limits. Or, for example, the load limit threshold may be any value that is greater than or equal to an established maximum impact force the load bearing member 105 can withstand without plastic deformation. Such a scenario may be applicable, for example, if safety standards in motor vehicles continually evolve, or if, for example, the system 100 is employed in an application other than in a stationary motor vehicle, such as a boat or airplane.

As an additional or alternative safety measure, the system 100 may include a backing plate 131 attached to or integrally formed with the mounting member 101. The backing plate 131 may comprise the same or different materials as the mounting member 101. The backing plate 131 is configured to prevent movement of the load bearing member 105 and/or the load bearing member actuator 107 at least partially along the direction 121 caused by any impact load applied to the load bearing member 105.

According to various embodiments, the system 100 may include or be in communication with a controller 150 implemented in a chip set such as that discussed below in FIG. 10 that is either on-board the system 100 or positioned remotely from the system 100. For example, the controller 150 may be hardwired to the system 100 or may be configured to communicate wirelessly with the system 100 via any of a WIFI connection, Bluetooth® connection, near field communication, and/or any other wireless protocol, etc.

The controller 150 may be configured to communicate either directly or indirectly with any of the load bearing member actuator 107 and/or the shear member actuator 115 to cause at least the first end portion 105a of the load bearing member 105 to be moved to the predetermined position on demand. For example, the controller 150 may be configured to determine a vehicle to which the system 100 is attached is made to be in a parked position by either interfacing with the vehicle's control system or based on one or more motion sensors, for example.

Upon determining the vehicle is in a parked position, the controller 150 may cause the first end portion 105a to be moved from the fully retracted position to a predetermined position that may be set for a parking application which may include a parking type and/or a predetermined position based on a determined available spacing between the vehicle and any nearby vehicle or object. Or, for example, the controller 150 may be configured to cause the first end portion 105a of the load bearing member 105 to be moved to the predetermined position upon receipt of an instruction from a user or vehicle operator if the vehicle is in motion or not officially in a parked position. Such an instruction may be to move the first end portion 105a of the load bearing member 105 to a predetermined position that corresponds with a position that would normally apply if the vehicle were in a parked position, or an instruction may be based on a user input that indicates a custom predetermined position. Accordingly, in some embodiments, the controller 150 may be configured to distinguish between a vehicle that is merely stationary and a vehicle that is parked so as to avoid unnecessary or unwanted deployment of the first end portion 105a of the load bearing member.

If the controller 150 is configured to control movement of the first end portion 105a of the load bearing member 105, a user could instruct that the first end portion 105a be moved to a specific predetermined position that is a specific deployment amount from the fully retracted position or external plane or surface 126 of the vehicular external element 119 such as 6 inches, or the user may instruct that the first end portion 105a be moved until the user indicates that the movement should stop. An instruction to stop movement of the first end portion 105a of the load bearing member 105 yields the predetermined position at the moment that the instruction to stop movement is provided by the user.

Similarly, the controller 150 may control movement of the first end portion 105a of the load bearing member 105 to a predetermined position based on a received instruction to move the first end portion 105a of the load bearing member 105 so that one or more lifestyle accessories 122 or lifestyle accessory support members 124 may be attached to the first end portion 105a. The predetermined position in this application, as discussed above, may be based on a particular type of lifestyle accessory 122 that is to be attached to the load bearing member 105, based on a determined available spacing for deployment of the first end portion 105a of the load bearing member 105, or based on a user input or instruction.

In one or more embodiments, the controller 150 may be configured to communicate with at least one sensor 151 that may be onboard the system 100 or positioned on a vehicle to which the system 100 is attached. The controller 150 may be configured to communicate with any sensor 151 by way of a hard wired or wireless connection such as a WIFI connection, Bluetooth® connection, near field communication, and/or any other wireless protocol, etc. Any number of sensors 151 may be individually or collectively configured to collect data that may be used by the controller 150 to determine any combination of distance between the sensor 151 or vehicle to which the system 100 is attached and an object such as another vehicle or obstruction, the distance between the first end portion 105a and any object, and/or any movement of the vehicle to which the system 100 is attached. Accordingly, in some embodiments, the controller 150 may receive data from a sensor 151 to determine an amount of free space between the first end portion 105a and/or vehicle and any object via a proximity sensor 151 to ensure that the first end portion 105a is not deployed to a predetermined position unless there exists sufficient free space to allow a designated deployment amount. In some embodiments, as discussed above, the predetermined position is based, at least in part, on the determined amount of free space between the first end portion 105a of the load bearing member and/or the vehicle and any determined object in a range of the sensor 151.

According to various embodiments, the controller 150 may be configured to communicate with any number of system 100's that may be attached to any portion of a vehicle, as discussed above. For example, a motor vehicle may have four system 100's, system 100a, system 100b, system 110c, and system 100d attached to a vehicular frame 117. System 100a and system 100b could be attached to a front portion of the motor vehicle while system 100c and 100d could be attached to a rear portion of the motor vehicle. The controller 150, in this example, may be configured to control each of the four systems 100a-d so that each of the systems 100 moves the respective first end portions 105a of its respective load bearing members 105 to a same or different predetermined position. For example, based on sensor 151 feedback and distance determination for the front portion and rear portion of the vehicle, the controller 150 may cause the front system 100a and the front system 100b to move their respective first end portions 105a to a predetermined position that is of a lesser distance from their corresponding fully retracted positions than the rear system 100c and rear system 100d if there is simply less room to deploy the first end portions 105a of the front systems 100a and 100b than the rear systems 100c and 100d.

The controller 150 is also configured to cause the first end portion 105a to be retracted to a predetermined position that is the fully retracted position or a predetermined position that is closer to the fully retracted position than a currently deployed position of the first end portion 105a of the load bearing member 105 on demand. Such a retraction might be either based, for example, on a determination or instruction that the vehicle is about to move from a parked or stationary position to ease egress from the parked or stationary position, to reduce the amount of spacing that is being preserved around a stationary vehicle, or to simply retract the first end portion 105a of the load bearing member 105 when the load bearing member 105 is no longer needed for lifestyle accessory 122 attachment.

According to various embodiments, the controller 150 may be in communication with a vehicle's horn system, or the system 100 may additionally comprise a horn or speaker 128 such that the controller 150 may cause an audio alert as a safety convenience for the surrounding area to indicate that the load bearing member 105a is being moved to a predetermined position by way of deployment away from the vehicular frame 117 in the direction 121 and/or being retracted toward the vehicular frame 117 along the direction 121. Similarly, the first end portion 105a of the load bearing member may be outfitted with one or more lights 130 that may include, for example, light bulbs or LEDs that flash as an alert that the first end portion 105a is in motion. Alternatively, the controller 150 may be in communication with the vehicle's lighting system or with an external lighting system 132 associated with the system 100, for example, to provide such a visual alert.

As discussed above, in one or more embodiments, inherent to the high strength design of the load bearing member 105 and the other components of the system 100 to withstand the above-mentioned impact loads, the load bearing member 105 also serves as a high strength cantilevered support that allows for load-bearing lifestyle accessories 122 to be attached to and supported by the load bearing member 105. As such, in this example, the first end portion 105a is configured to facilitate lifestyle accessory attachments by way of a lifestyle accessory receiving portion 129. The lifestyle accessory receiving portion 129 is configured to enable attachment of one or more lifestyle accessory support members 124 that may be any of a bracket that fits into the lifestyle accessory receiving portion 129 or a clamp that attaches to the lifestyle accessory receiving portion 129. In the alternative, the lifestyle accessory receiving portion 129 may be a protrusion from the load bearing member 105 to which a life style accessory support member 124 may be attached. Regardless of its geometry, in some embodiments, the lifestyle accessory receiving portion 129 may be configured to cooperate with specific proprietary lifestyle support members or, in other embodiments, the lifestyle accessory receiving portion 129 may be configured to universally cooperate with various types of commercially available lifestyle accessory support members 124.

In some embodiments, if a vehicle is outfitted with more than one system 100, the plurality of system 100's may be configured to operate separately to accommodate one or more lifestyle accessories 122 or cooperatively to accommodate the same lifestyle accessory 122 or many lifestyle accessories 122 via one or more lifestyle accessory support members 124.

For example, one or more lifestyle accessory support members 124 may be separate from or integrally formed with any lifestyle accessory 122 and configured to cooperate with the lifestyle accessory receiving portion 129. Example lifestyle accessories 122 may include, but not be limited to: mounts for chairs or loveseat-sized benches that could be used in various tailgating and/or camping applications; supports or mounts for tables in front of or behind a vehicle to support tools or parts during maintenance/repair of the vehicle; mounts for a grill or cooler during tailgating and/or camping activities; mounts for a tent structure either over or adjacent to the vehicle using front and/or rear system 100's, etc.

Figure 2:
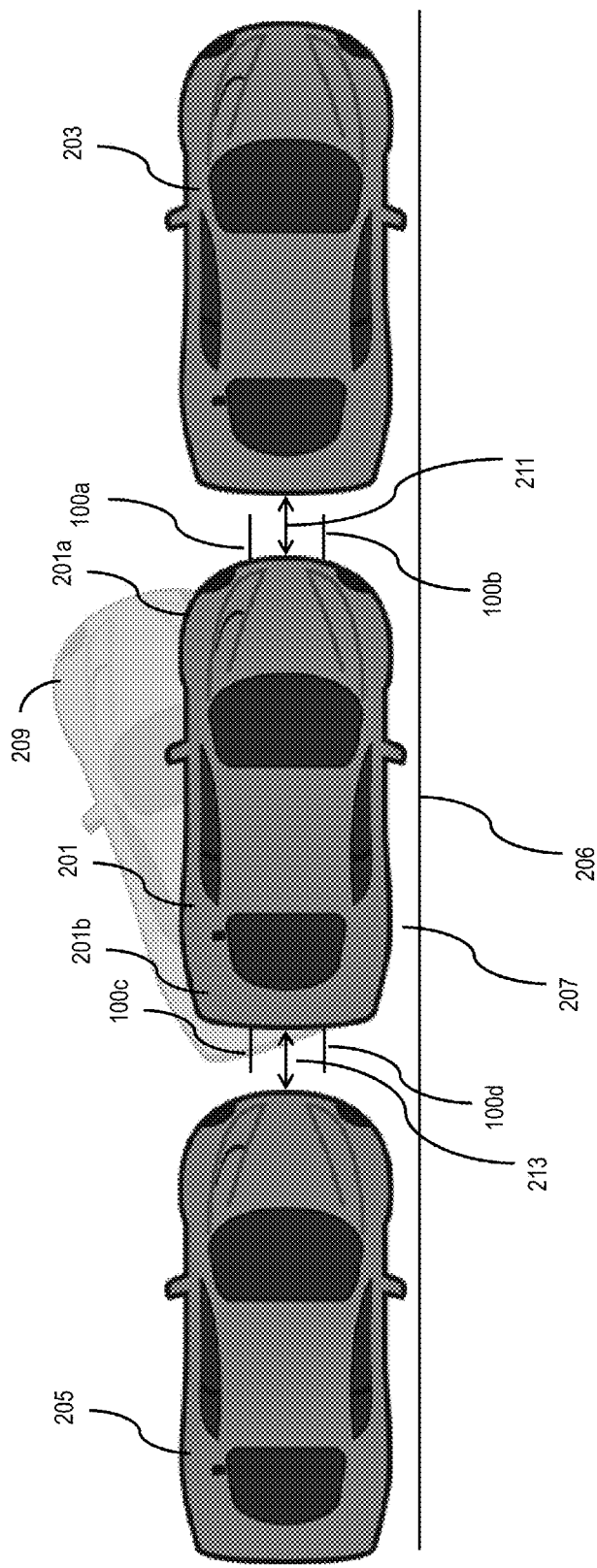
FIG. 2 is a diagram of an example implementation of a system capable of preserving spacing around a vehicle, according to one example embodiment.

FIG. 2 illustrates an example implementation of a plurality of system 100's in a motor-vehicle application, according to one embodiment. As discussed above, one or more system 100's may be used individually or together to preserve spacing around a stationary vehicle. In this example a motor vehicle 201 is in a stationary position 207 between a forward motor vehicle 203 and a rearward motor vehicle 205 along a curb 206. The motor vehicle 201 has system 100a and system 100b attached to a forward portion 201a of the motor vehicle 201 to preserve forward spacing 211. The motor vehicle 201 also has a system 100c and 100d attached a rearward portion 201b of the motor vehicle 201 to preserve rearward spacing 213.

Each of the system 100's have their respective load bearing members 105, discussed above, deployed to their respective predetermined positions to preserve the forward spacing 211 and the rearward spacing 213. If, for example, motor vehicle 201 is in the stationary position 207, encroachment by either of the forward motor vehicle 203 or rearward motor vehicle 205 into the forward spacing 211 or the rearward spacing 213, respectively, is limited because the system 100's are preserving that space. As such, various external vehicular elements such are bumpers, in this example, may be protected from contact with the forward motor vehicle 203 and the rearward motor vehicle 205. When a vehicle operator desires to move the motor vehicle 201 from the stationary position 207, the vehicle operator may instruct the system 100's to retract their respective load bearing members 105 by, for example, an explicit instruction processed by the controller 150, or if the controller 150 is configured to communicate with the motor vehicle 201's control system, the controller 150 may cause the system 100's to move their respective load bearing members 105 such that the first end portion 105a is moved to a predetermined position at least closer to the fully retracted position than a current deployed state or all the way to the fully retracted position. Alternatively, the load bearing members 105 may be retracted manually by a hand crank, for example. Once the load bearing members 105 are in the fully retracted position, or at least partially moved toward the fully retracted position, the motor vehicle 201 is able to move from the stationary position 207 to an egress position 209 with plenty of room for maneuvering between the motor vehicle 201 and the forward motor vehicle 203 and rearward motor vehicle 205.

Figure 3:
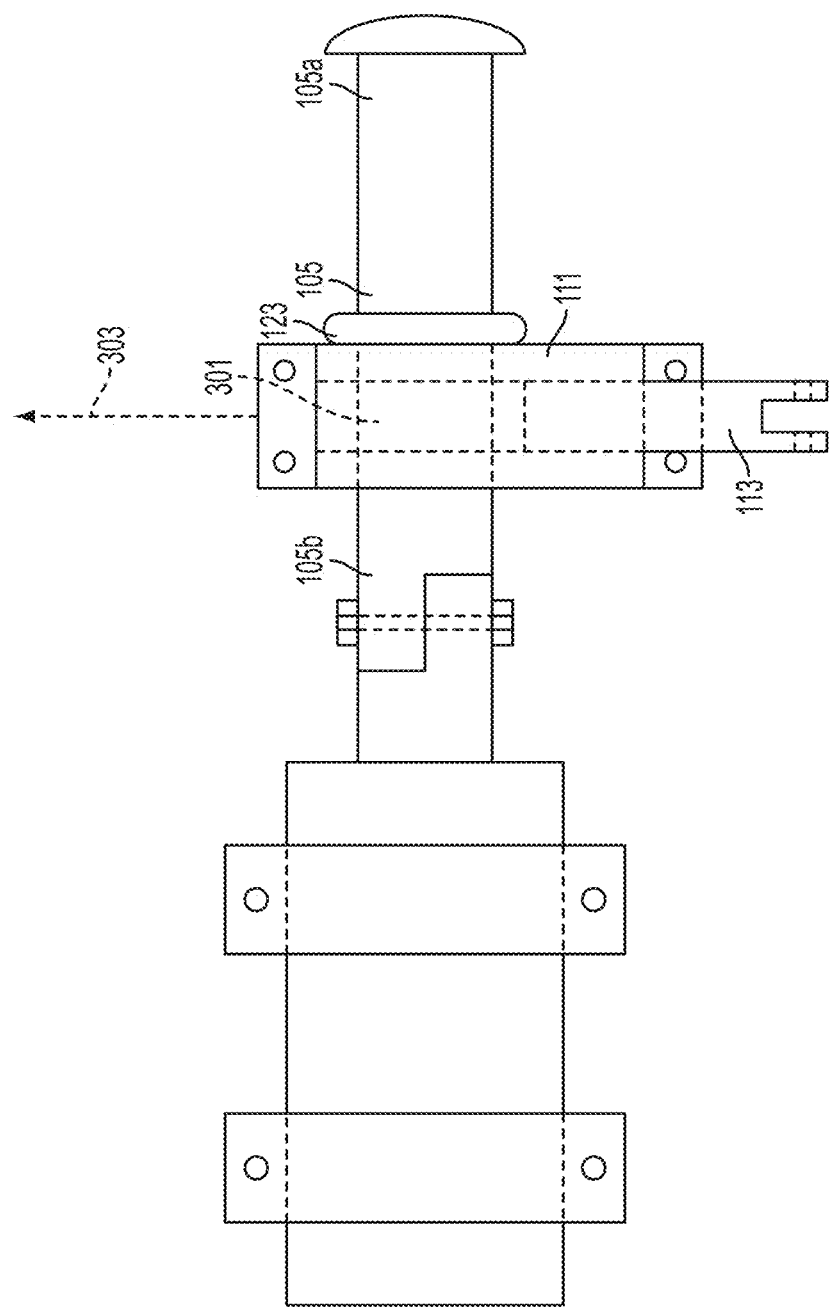
FIG. 3 is a diagram of an example shear member support bracket and shear member actuator, according to one example embodiment.

FIG. 3 illustrates a side-view of the system 100 having a top-mounted shear member support bracket 111, according to one example embodiment.

The shear member 113, in this example, is in a disengaged position. The controller 150, discussed above, is configured to communicate either directly or indirectly with the shear member actuator 115, discussed above, to cause the shear member 113 to be moved from the illustrated disengaged position into an engaged position within the load bearing member 105 as it is moved into a shear member receiving portion 301 in a direction 303.

As discussed above, the shear member support bracket 111 is configured to (1) support the load bearing member 105 so as to allow the first end portion 105a of the load bearing member 105 to be moved to the predetermined position, (2) support the shear member actuator 115, discussed above, and (3) allow the shear member 113 to pass through the shear member support bracket 111 and into the shear member receiving portion 301 in the load bearing member 105. The shear member receiving portion 301 may be, for example, a hole or slot in the load bearing member 105 that is configured to have a same geometry in its cross-section as that of the shear member 113 in its cross-section. Accordingly, the shear member 113 and shear member receiving portion 301 are configured to mate when the load bearing member 105 is in a deployed position that aligns with the shear member 113, such as in a fully extended position. The shear member receiving portion 301 is between the first end portion 105a and the second end portion 105b of the load bearing member 105. The shear member receiving portion 301 may be any of a through-hole or partial bore into the load bearing member 105.

Figure 4:
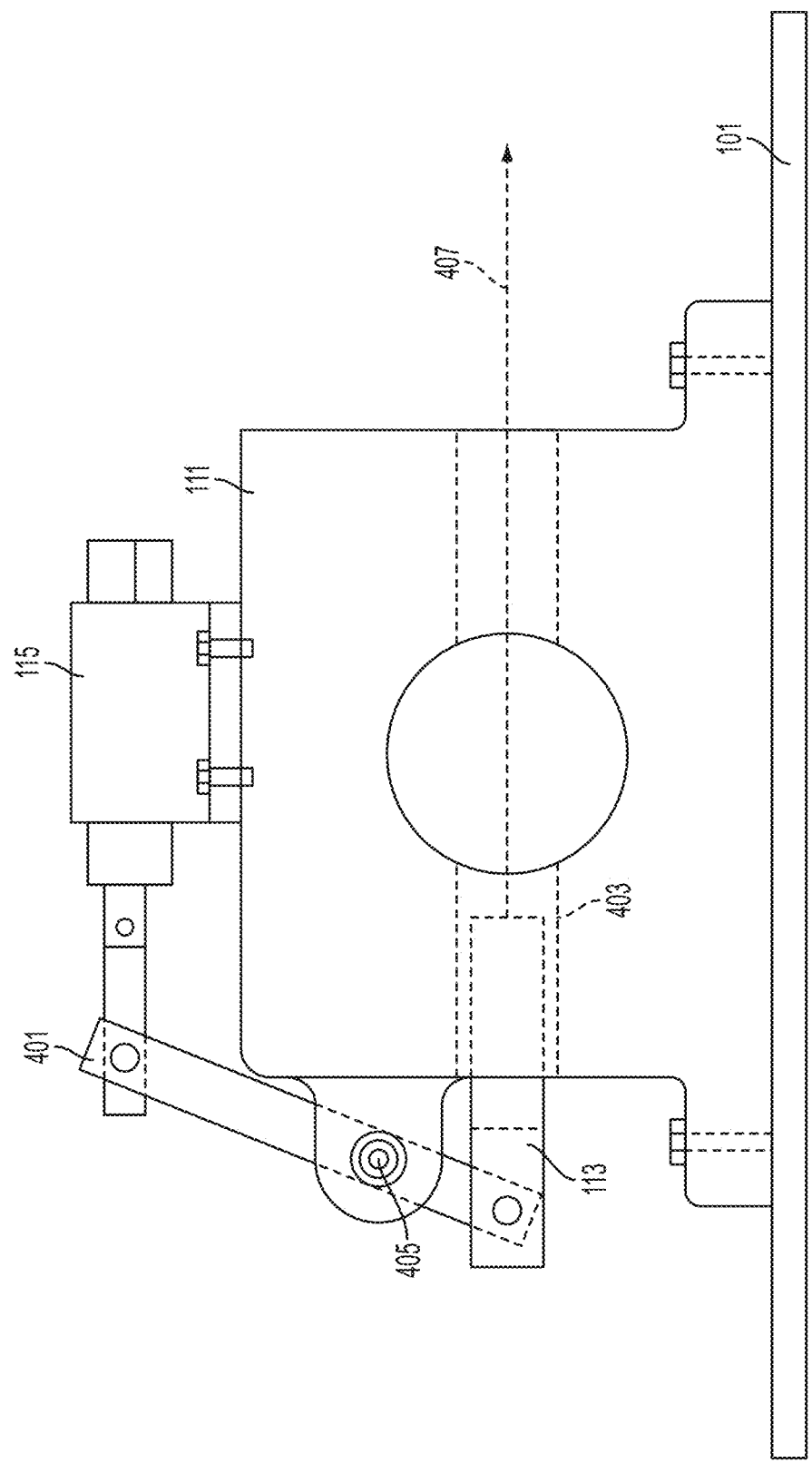
FIG. 4 is a diagram of a close-up view of an example shear member support bracket, according to one example embodiment.

FIG. 4 illustrates a close-up side view of the shear member support bracket 111. In this example the shear member support bracket 111 is configured to have the shear member actuator 115 mounted to a top-side of the shear member support bracket 111 with respect to the mounting member 101. The shear member 113 is in a disengaged position as it is not inserted into the shear member receiving portion 301, discussed above. The shear member 113 is caused to move by the shear member actuator 115 in this example by way of a linkage 401 that drives the shear member 113 through the shear member support bracket 111 and into the shear member receiving portion 301. The linkage 401 may be set in motion by the shear member actuator 115 moving the shear member 113 into the engaged position in the shear member receiving portion 301 through a support member opening 403 or, in some embodiments, the linkage 401 may include a pivotal torsion spring 405 configured to cause the linkage 401 to move the shear member 113 into or out of the shear member receiving portion 301 through the shear support opening 403, depending on arrangement of the shear member actuator 115, the linkage 401 and the spring 405. For example, the shear member actuator 115 may cause the shear member 113 to move in a direction opposite that of a force resulting from the spring 405 applied to the shear member 113 by way of the linkage 401. Accordingly, the shear member actuator 115 could be any of a push or pull-type actuator, or the shear member actuator 115 could be configured to push and pull the linkage 401, causing motion of the shear member 113. The linkage 401 is configured to affect the travel length of the shear member 113 in the direction 407 which may be any of less than, equal to, or greater than a diameter or thickness of the load bearing member 105 in the direction 407, depending on any shear member force diversion degree requirements of a particular application of the system 100. This example arrangement has a smaller footprint than having a linear actuator as the shear member actuator 115, which will be discussed in more detail below.

Figure 5:
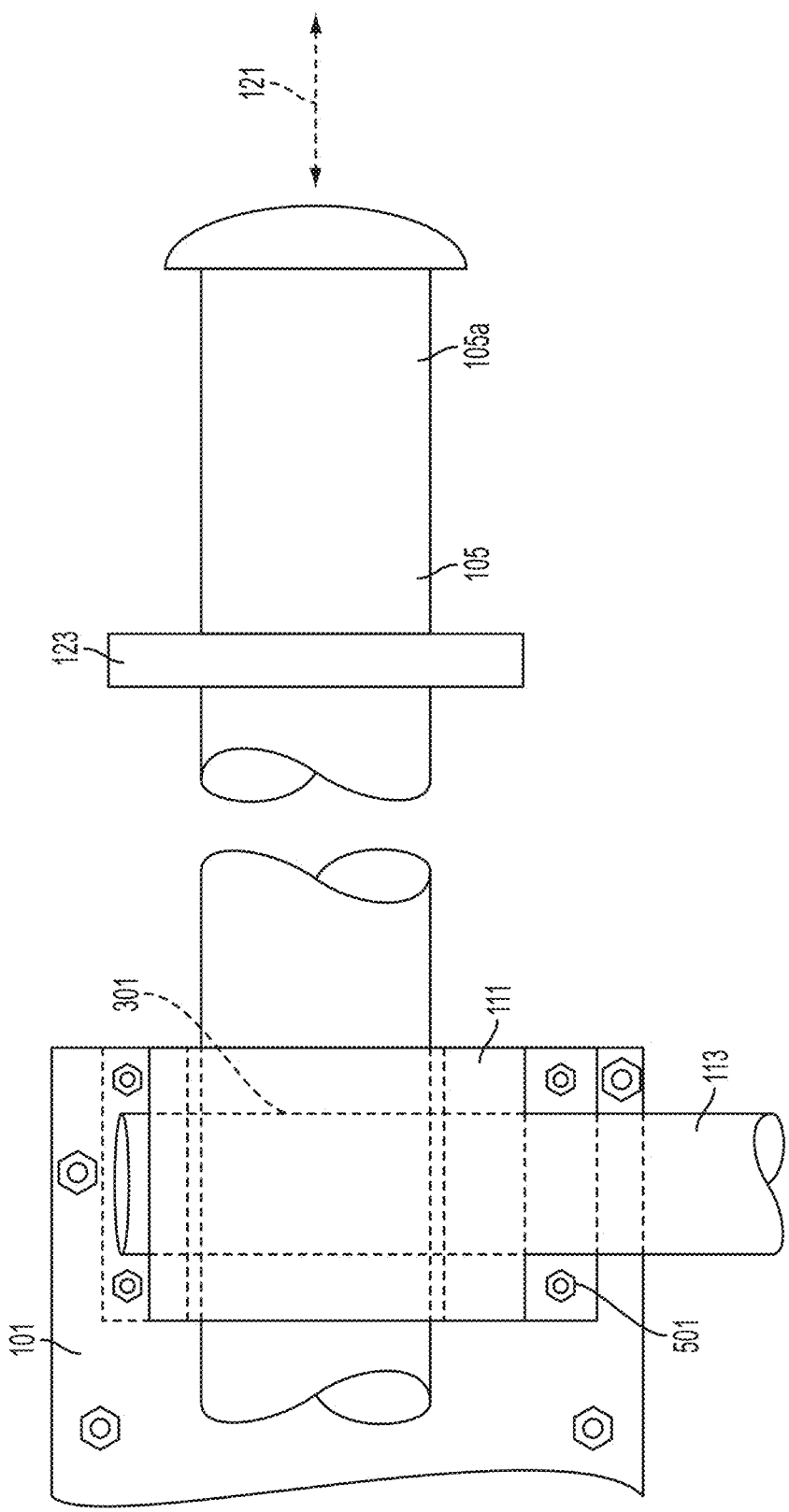
FIG. 5 is a diagram of a shear member in an engaged position, according to one example embodiment.

FIG. 5 illustrates an example embodiment in which the first portion 105a of the load bearing member 105 is in a predetermined position other than its fully retracted position and the shear member 113 is in an engaged position within the shear member receiving portion 301. The shear member 113 is used to isolate the load bearing member actuator 107, discussed above, from any impact loads applied to the first end portion 105a of the load bearing member 105. The shear member re-directs a load path induced into the load bearing member 105 when it is deployed to a predetermined position other than the fully retracted position, such as the fully extended position or any point between the fully extended position and the fully retracted position. To be able to withstand impact loads applied to the load bearing member, the shear member support bracket 111 may be integrally formed with the mounting member 101 or attached to the mounting member 101 by high strength fasteners 501 such as screws or bolts that are of a sufficient strength to accommodate expected impact loads for a particular implementation of the system 100.

As discussed above, the shear member 113 is caused to be moved to the engaged position inside the shear member receiving portion 301 which may be, for example, a transverse through-hole or partial bore in the load bearing member 105, at least when the first end portion 105a of the load bearing member 105 has reached its fully extended position. Alternatively, the load bearing member may have multiple shear member receiving portions 301 along its length in the direction 121 to accommodate the shear member 113 being moved into an engaged position at one of a plurality of deployment position possibilities so as to provide load diversion capability regardless of whether the first end portion 105a of the load bearing member 105 is in its fully extended position, and to provide flexibility of use. For example, if there is only a limited amount of space available for moving the first end portion 105a of the load bearing member 105 to a predetermined position and that predetermined position is less than the fully extended position, the system 100 could still provide the benefit of impact load diversion even if the first end portion 105a of the load bearing member 105 is not in its fully extended position, provided the predetermined position is one that coincides with one of the multiple shear member receiving portions 301 being aligned with the shear member 113. As the first end portion 105a is moved away from the fully retracted position, the collar 123 is also moved away from the shear member support bracket 111, as is illustrated in FIG. 5, because the first end portion 105a of the load bearing member is deployed to a predetermined position other than the fully retracted position.

Figure 6:
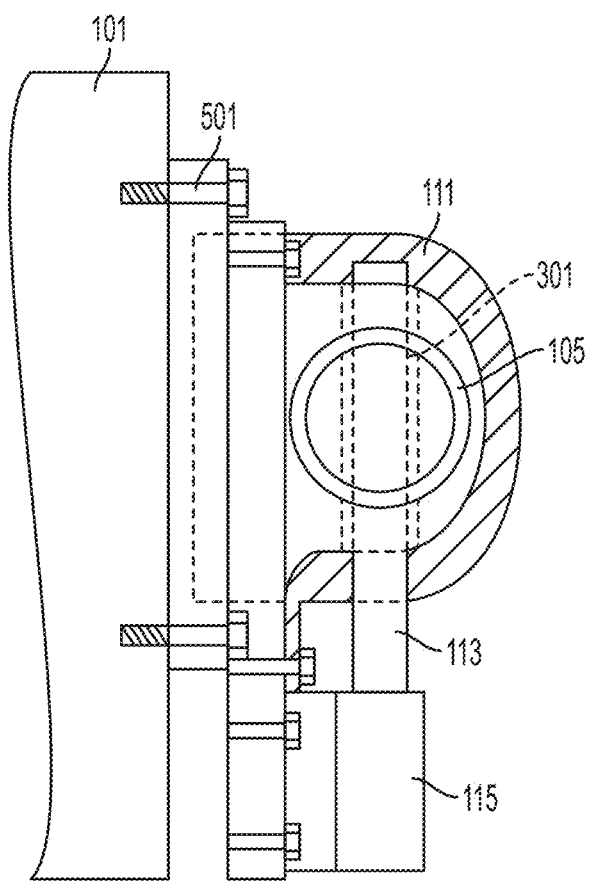
FIG. 6 is a diagram of an example of a shear member support bracket and shear member actuator orientation, according to one example embodiment.

FIG. 6 illustrates a side-view of an example shear member support bracket 111 having a linear shear member actuator 115, according to one example embodiment. The shear member support bracket 111, in this example, is attached to the mounting member 101 by fasteners 501. The shear member 113 is in its engaged position inside the shear member receiving portion 301 of the load bearing member 105. In this example embodiment, the shear member actuator 115 is a linear actuator configured to move the shear member 113 between its engaged position inside the shear member receiving portion 301 and its disengaged position outside of the shear member receiving portion 301. In this embodiment, because the shear member actuator 115 is a linear actuator, there is no need for a complex linkage system like linkage 401, discussed above, but this embodiment would increase the footprint size of the system 100 compared to a system 100 having a shear member actuator 115 mounted on a top-side of the shear member support bracket 111 with respect to the mounting member 101.

Figure 7:
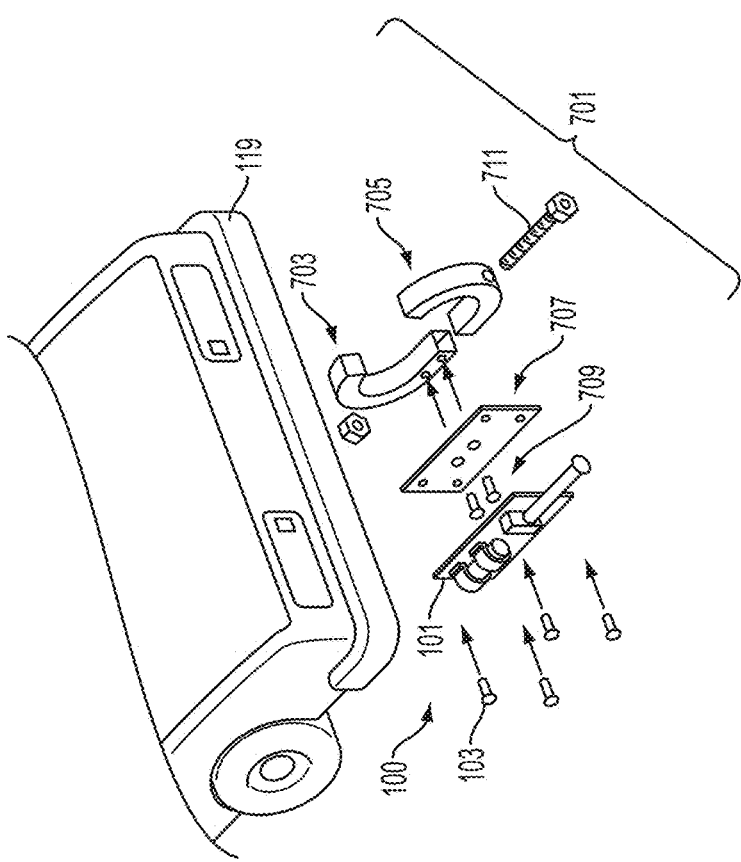
FIG. 7 is a diagram of an indirect attachment of a system capable of preserving spacing around a vehicle to a vehicular frame, according to one example embodiment.

FIG. 7 illustrates an example embodiment in which the mounting member 101 of the system 100 is configured to be indirectly attached to a vehicular frame 117 discussed above and hidden from view in by a vehicular external element 119. This embodiment is an example of an alternative implementation of the system 100 in which a vehicle to which the system 100 is attached does not include a cooperating vehicular external element 119 such as one having a through-hole, as discussed above, or in which it is undesirable to attach the mounting member 101 directly to the vehicular frame 117.

To facilitate indirectly attaching the mounting member 101 to the vehicular frame 117, the system 100 may further comprise a mounting kit 701 that is configured to coordinate with a vehicular external element 119 and/or the vehicular frame 117. In this example, the mounting kit 701 comprises a first clamp 703, a second clamp 705, a base plate 707, mounting kit fasteners 709, and a mounting kit coupling 711. In this example, the mounting kit 701 is configured to be attached to, or to securely, surround a vehicular external element 119, such as a bumper, or a portion of a vehicular frame 117. Each of the first clamp 703 and the second clamp 705 may be mounted onto the vehicular external element 119 or the vehicular frame 117 and secured in place by the mounting kit coupling 711. The base plate 707 is accordingly attached to one or more of the first clamp 703 and the second clamp 705 by mounting kit fasteners 709. The mounting member 101 of the system 100 is then able to be indirectly mounted to the vehicular frame 117 by attaching the mounting member 101 to the base plate 707 by way of coupling 103 instead of directly to the vehicular frame 117 by way of the couplings 103.

It should be noted that the mounting kit 701 may take any form that enables the system 100 to be indirectly attached to the vehicular frame 117 such as, but not limited to, a singular first clamp 703, or any variation of the number of clamps or alternative numbers of base plates 707. For example, various vehicles may require specific or alternative arrangements of mounting kit 701 features to attach a system 100 indirectly to a particular vehicular frame 117 safely and efficiently.

Figure 8:
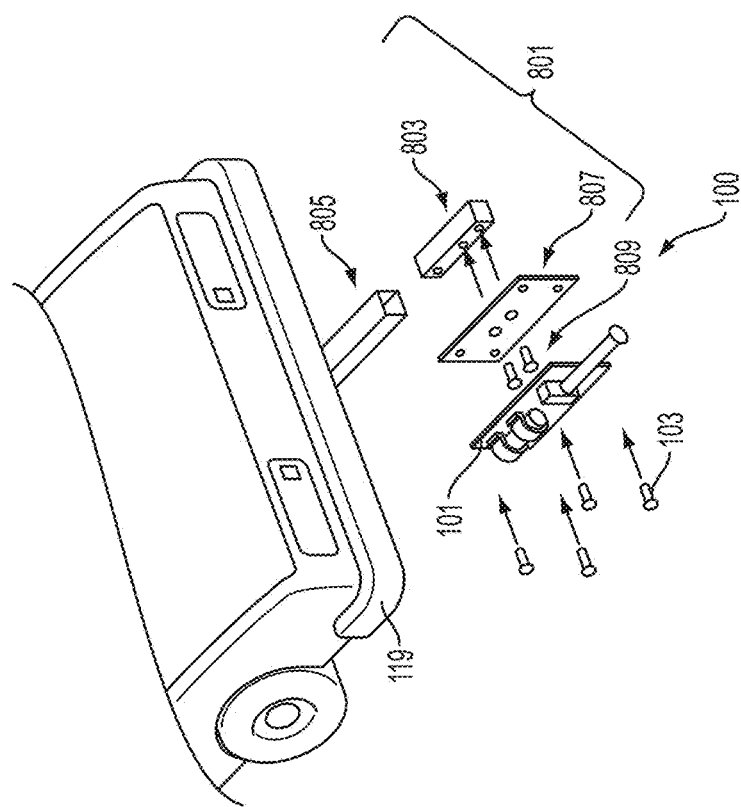
FIG. 8 is a diagram of an indirect attachment of a system capable of preserving spacing around a vehicle to a vehicular frame, according to one example embodiment.

FIG. 8. illustrates another example embodiment in which the mounting member 101 of the system 100 is configured to be indirectly attached to a vehicular frame 117 discussed above and hidden from view in by a vehicular external element 119.

In this example, the system 100 further comprises a trailer hitch mounting kit 801 that includes a trailer hitch adapter 803 configured to be inserted into a conventional or proprietary trailer hitch 805. The trailer hitch 805, conventionally being securely mounted to the vehicular frame 117 or a vehicular external element 119, provides a means to indirectly attach the mounting member 101 to the vehicular frame 117. The trailer hitch mounting kit 801 also includes a trailer hitch base plate 807 that is configured to be attached to the trailer hitch adapter 803 by trailer hit fasteners 809. The trailer hitch base plate 807 and the trailer hitch fasteners 809 may be the same as, or different from, the base plate 707 and mounting kit fasteners 709, discussed above.

The mounting member 101 of the system 100 can then be indirectly mounted to the vehicular frame 117 by attaching the mounting member 101 to the trailer hitch base plate 807 using couplings 103 instead of directly to the vehicular frame 117 by way of the couplings 103.

Figure 9:
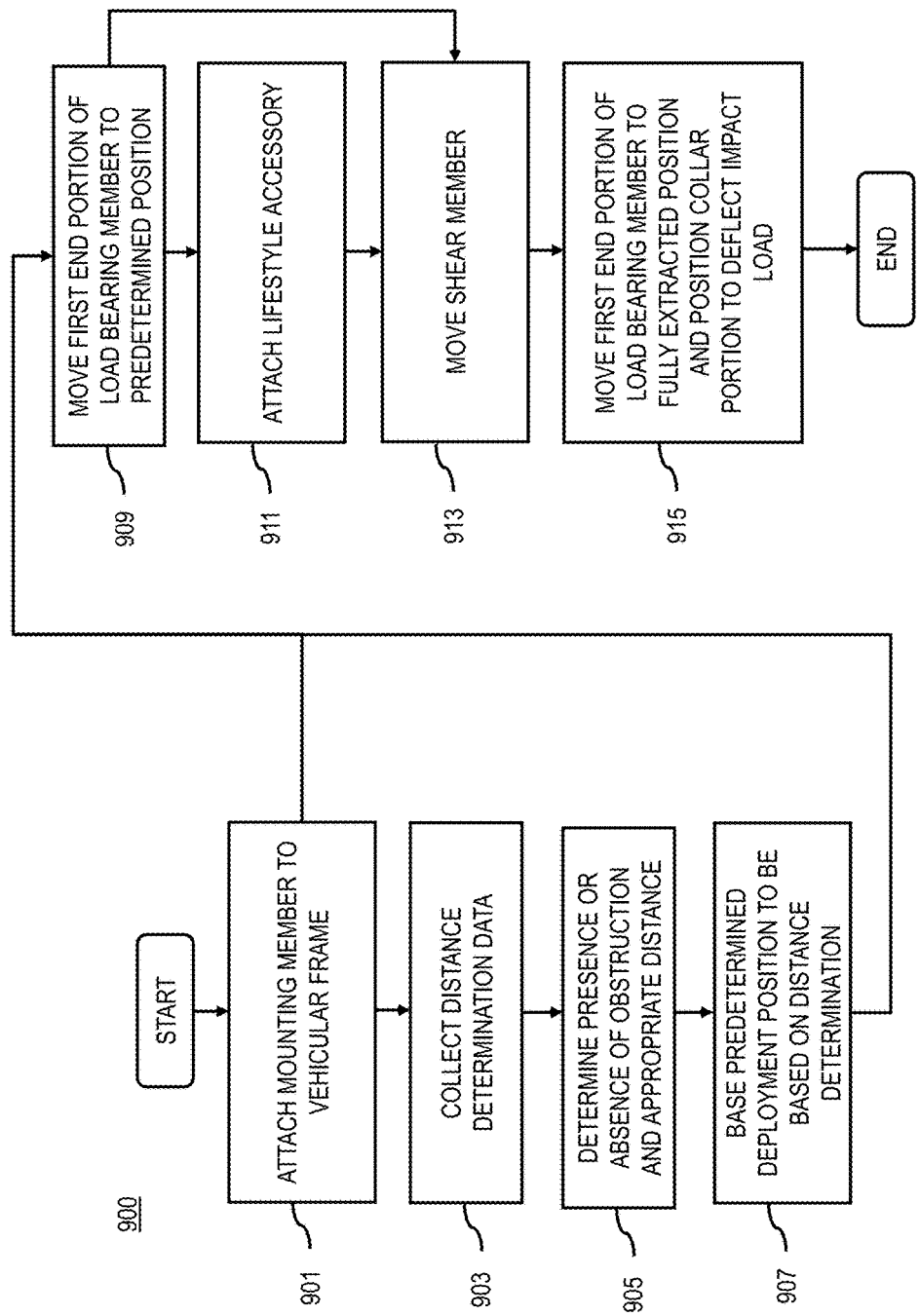
FIG. 9 is a flowchart of a process for preserving spacing around a vehicle, according to one example embodiment.

FIG. 9 is a flowchart of a process for preserving spacing around a vehicle, according to one embodiment. In one embodiment, the controller 150, discussed above, performs at least some of the steps in process 900 and, for example, is implemented in a chip set including a processor and a memory as shown in FIG. 10. In step 901, the mounting member 101, having at least one support bracket 109, is attached to a vehicular frame 117 by one or more couplings 103. In embodiments, as discussed above, the one or more couplings 103 are configured to fail based, at least in part, on a load threshold being exceeded. According to various embodiments, the load threshold is associated with an impact load applied to at least the first end portion 105a of the load bearing member 105. In some embodiments, as discussed above, the load threshold is greater than or equal to about 25,000 lbf. In one or more embodiments, as discussed above, the load bearing member 105 is configured to withstand an impact force applied to the first end portion 105a of up to about 15,000 lbf without plastic deformation.

Next, if the system 100 is configured to include one or more sensors 151, discussed above, the process optionally continues to step 903. If the system 100 does not include a sensor 151, then the process skips to step 909. In step 903, the controller 150 causes, at least in part, the sensor 151 to collect data related to distance determination. Then, in step 905, the controller 150 processes the data collected by the sensor 151 to determine one or more of (1) the presence of an obstruction such as another vehicle or object, (2) the distance between the first end portion 105a of the load bearing member 105 and the determined obstruction, and (3) the absence of an obstruction.

The process continues to step 907 in which the controller 150 causes, at least in part, a predetermined position to which at least the first end portion 105a of the load bearing member 105 is to be moved to be based, at least in part, on one or more of the determined distance between the first end portion 105a of the load bearing member 105 and the determined obstruction; the determined absence of an obstruction; and/or a user preference such as a limitation on the distance of the predetermined position from the fully retracted position or an override of any limitation that the controller 150 may impose on a distance the predetermined position may be in relation to the fully retracted position based on any determined presence of one or more obstructions Next, in step 909, the controller 150 causes at least the first end portion 105a of the load bearing member 105 to be moved to the predetermined position in the direction 121 within a range from a fully retracted position to a fully extended position by way of the load bearing member actuator 107. The load bearing member actuator 107 is operatively coupled to the load bearing member 105 so that the load bearing member actuator 107 is configured to selectively control movement of at least the first end portion 105a of the load bearing member 105.

When the first end portion 105a of the load bearing member 105 is being moved to the predetermined position, the first end portion 105a is either caused to be moved through a cooperating vehicular external element 119 having a through-hole, as discussed above, or caused to be moved while avoiding contact with a vehicular external element 119. If the first end portion 105a of the load bearing member 105 is caused to be moved to the predetermined position while avoiding contact with the vehicular external element, then, as discussed above, the mounting member 101 and at least one support bracket 109 are either configured to cantilever at least a section of the load bearing member 105 to facilitate movement of the first end portion 105a of the load bearing member 105 to the predetermined position while avoiding contact with the vehicular external element 119, or the mounting member 101 is indirectly attached to the vehicular frame 117 by way of either the mounting kit 701, or trailer hitch mounting kit 801, for example.

If the load bearing member is configured to include a lifestyle accessory receiving portion 129, as discussed above, the process optionally continues to step 911; otherwise, the process continues to step 913. In step 911, the controller 150 causes, at least in part, the load bearing member 105 to accommodate one or more lifestyle accessory support members 124 associated with at least one optional attachment such as a lifestyle accessory 122. As discussed above, the at least one optional attachment may be one or more of a bicycle rack, a seat, a table, a grill, a storage container, tents, etc. The controller 150 may cause the first end portion 105a of the load bearing member 105 to be moved to a predetermined position associated with successfully accommodating any generic lifestyle accessory 122 or any specific lifestyle accessory 122, or to a predetermined position based on a determination of an available spacing or a user instruction.

As discussed above, in some embodiments, the support brackets 109 may also include at least one shear member support bracket 111. As such, the process continues to step 913 in which the controller 150 causes, at least in part, the shear member actuator 115 to move the shear member 113 supported by the shear member support bracket 111 between an engaged position and a disengaged position. The shear member actuator 115 is operatively coupled to the shear member 113. The shear member 113, as discussed above, is configured to deflect a load applied to at least the first end portion 105a of the load bearing member 105 from the load bearing member 105 through the shear member support bracket 111 when the shear member 113 is in the engaged position. The shear member 113 is in its engaged position when the shear member 113 is inserted into a shear member receiving portion 301 positioned between the first end portion 105a and the second end portion 105b of the load bearing member 105.

Then, in step 915, the controller 150 causes, at least in part, the collar 123 positioned between the first end portion 105a and the second end portion 105b of the load bearing member 105 to be in position to deflect a load applied to at least the first end portion 105a of the load bearing member 105 from the load bearing member 105 through at least one support bracket 109 that may include the shear member support bracket 109, depending on the arrangement of the system 100, when the first end portion 105a of the load bearing member 105 is in the fully retracted position.

The processes described herein, wholly or at least partially, for preserving spacing around a vehicle may be advantageously implemented via software, hardware, firmware, or a combination of software and/or firmware and/or hardware. For example, the processes described herein, may be advantageously implemented via processor(s), a Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
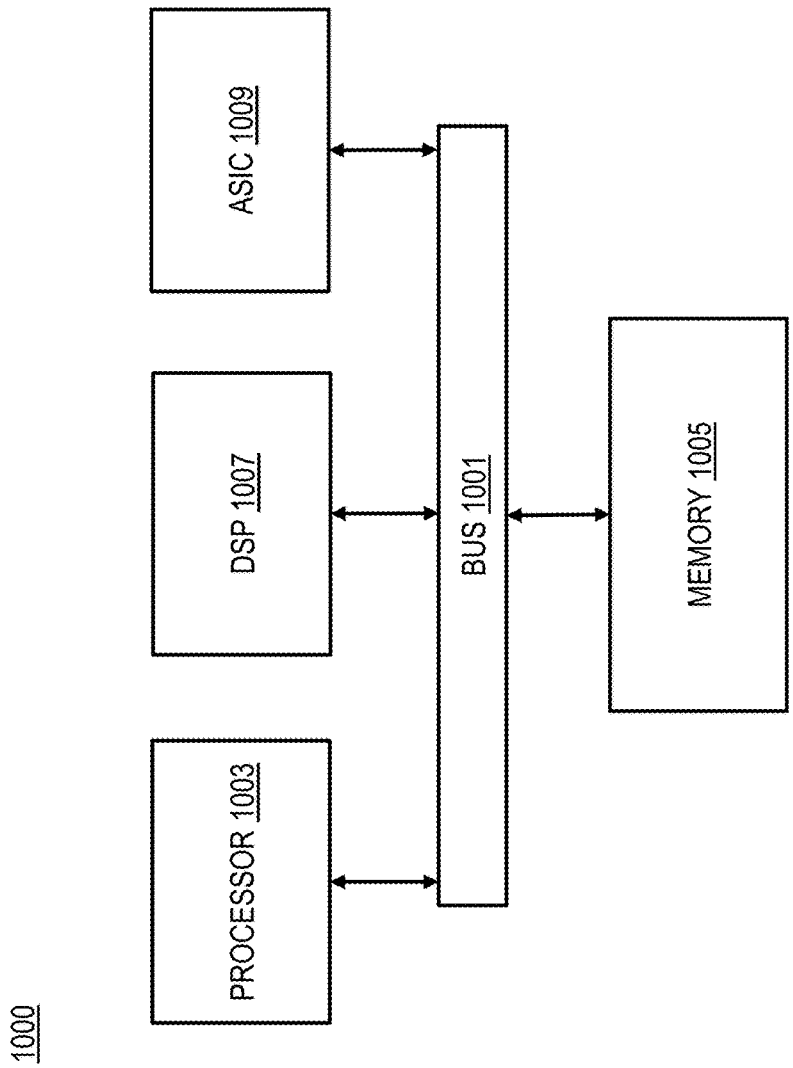
FIG. 10 is a diagram of a chip set that can be used to implement an example embodiment.

FIG. 10 illustrates a chip set or chip 1000 upon which an embodiment of the controller may be implemented. Chip set or chip 1000 is programmed to preserve spacing around a vehicle as described herein, and may include, for example, bus 1001, processor 1003, memory 1005, DSP 1007 and ASIC 1009 components.

The processor 1003 and memory 1005 may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments, the chip set or chip 1000 can be implemented in a single chip. It is further contemplated that in certain embodiments, the chip set or chip 1000 can be implemented as a single "system on a chip." It is further contemplated that in certain embodiments, a separate ASIC would not be used, for example, and that all relevant functions as disclosed herein would be performed by a processor or processors. Chip set or chip 1000, or a portion thereof, constitutes a means for performing one or more steps of preserving spacing around a vehicle.

In one or more embodiments, the chip set or chip 1000 includes a communication mechanism, such as bus 1001, for passing information among the components of the chip set or chip 1000. Processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively, or in addition, the processor 1003 may include one or more microprocessors configured in tandem via the bus 1001 to enable independent execution of instructions, pipelining, and multithreading. The processor 1003 may also be accompanied by one or more specialized components, such as one or more digital signal processors (DSP) 1007 or one or more application-specific integrated circuits (ASIC) 1009, to perform certain processing functions and tasks. A DSP 1007 typically is configured to process real-world signals (e.g., sound) in real time independently of the processor 1003. Similarly, an ASIC 1009 can be configured to perform specialized functions that a more general purpose processor could not perform (or could not perform as easily). Other specialized components to aid in performing the functions described herein may include one or more field programmable gate arrays (FPGA), one or more controllers, or one or more other special-purpose computer chips.

In one or more embodiments, the processor (or multiple processors) 1003 performs a set of operations related to preserving spacing around a vehicle based on information as specified by a computer program code configured to cause such operations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations includes bringing information in from the bus 1001 and placing information on the bus 1001. The set of operations also typically includes comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1003, such as a sequence of operation codes, constitutes processor instructions, also called computer system instructions or, simply, computer instructions. Processors may be implemented as mechanical, electrical, magnetic, optical, chemical, or quantum components, among others, alone or in combination.

The processor 1003 and accompanying components have connectivity to the memory 1005 via the bus 1001. The memory 1005 may include one or more of dynamic memory (e.g., RAM, magnetic disk, writable optical disk, etc.) and static memory (e.g., ROM, CD-ROM, etc.) for storing executable instructions that when executed perform the steps described herein. The memory 1005 also stores the data associated with or generated by the execution of the steps.

In one or more embodiments, the memory 1005 stores information, including processor instructions for preserving spacing around a vehicle. Dynamic memory allows information stored therein to be changed by system 100. RAM allows a unit of information stored at a location called a memory address to be stored and retrieved independently of information at neighboring addresses. The memory 1005 is also used by the processor 1003 to store temporary values during execution of processor instructions. The memory 1005 may also be a read-only memory (ROM) or any other static storage device coupled to the bus 1001 for storing static information, including instructions, that is not changed by the system 100. Some memory is composed of volatile storage that loses the information stored thereon when power is lost. The memory 1005 may also be a non-volatile (persistent) storage device, such as a magnetic disk, optical disk, or flash card, for storing information, including instructions, that persists even when the system 100 is turned off or otherwise loses power.

The term "computer-readable medium" as used herein refers to any medium that participates in providing information to processor 1003, including instructions for execution. Such a medium may take many forms, including, but not limited to, computer-readable storage media (e.g., non-volatile media, volatile media), and transmission media. Non-volatile media include, for example, optical or magnetic disks. Volatile media include, for example, dynamic memory. Transmission media include, for example, twisted pair cables, coaxial cables, copper wire, fiber optic cables, and carrier waves that travel through space without wires or cables, such as acoustic waves and electromagnetic waves, including radio, optical, and infrared waves. Signals include man-made transient variations in amplitude, frequency, phase, polarization, or other physical properties transmitted through the transmission media. Common forms of computer-readable media include, for example, a floppy disk, flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

While a number of embodiments and implementations have been described, the disclosure is not so limited. Rather, the disclosure covers various obvious modifications and equivalent arrangements which fall within the purview of the appended claims. Although features of various embodiments are expressed in certain combinations among the claims, it is contemplated that these features can be arranged in any combination and order.

What is claimed is:

1. An apparatus for preserving spacing around a vehicle, the apparatus comprising:
   a load bearing member configured to be attached to the vehicle, the load bearing member having a first end portion and a second end portion opposite the first end portion, at least the first end portion of the load bearing member being movable to a predetermined position within a range that includes a fully retracted position and a fully extended position, the fully extended position being outside the vehicle when the load bearing member is attached to the vehicle; and
   a controller configured to cause, for a parking operation, the first end portion of the load bearing member to be moved to the predetermined position based on a received instruction indicative of a preset parking scenario stored in a non-transitory computer-readable storage medium,
   wherein
      for the parking operation, the predetermined position is one of a first preset position stored in the non-transitory computer-readable storage medium for a first parking scenario or a second preset position stored in the non-transitory computer-readable storage medium for a second parking scenario different from the first parking scenario, and
      at least one of the first preset position or the second preset position is different from the fully extended position and the fully retracted position.

2. The apparatus of claim 1, further comprising:
   a mounting member configured to support the load bearing member and the controller, the mounting member being configured to be attached to a frame of the vehicle.

3. The apparatus of claim 1, further comprising:
   a sensor communicatively coupled with the controller, the sensor being configured to collect data related to distance determination,
   wherein the controller is configured to determine one or more of (1) the presence of an obstruction, (2) the distance between the first end portion of the load bearing member and the determined obstruction, or (3) the absence of an obstruction based on the data collected by the sensor, and
   the controller is configured to alter the predetermined position based on one or more of the determined distance between the first end portion of the load bearing member and the determined obstruction, the determined absence of an obstruction, or a user preference.

4. The apparatus of claim 1, wherein the first end portion of the load bearing member is configured to be moved through a cooperating vehicular external element.

5. The apparatus of claim 1, wherein the load bearing member is attached to a frame of the vehicle by way of at least one support bracket configured to enable movement of the first end portion of the load bearing member to the predetermined position while avoiding contact with a vehicular external element.

6. The apparatus of claim 1, wherein the load bearing member further comprises a receiving portion configured to accommodate one or more support members associated with at least one optional attachment.

7. The apparatus of claim 6, wherein the at least one optional attachment comprises one or more of a bicycle rack, a seat, a table, a grill, a storage container, or a tent.

8. The apparatus of claim 7, wherein
   the controller is further configured to cause the first end portion of the load bearing member to be moved to the predetermined position based on a received instruction indicative of a preset lifestyle attachment function stored in the non-transitory computer-readable storage medium corresponding to whether the at least one optional attachment is the bicycle rack, the seat, the table, the grill, the storage container, or the tent.

9. The apparatus of claim 8, wherein
   the predetermined position is a third preset position stored in the non-transitory computer-readable storage medium different from the first preset position or the second preset position, and
   the controller is further configured to cause the first end portion of the load bearing member to be moved to the third preset position based only on the instruction indicative of the preset lifestyle attachment function.

10. The apparatus of claim 1, wherein the first parking scenario is based on an identified type of parking space within which the vehicle to which the load bearing member is attached is parked, and the second parking scenario is based on a determination that the vehicle to which the load bearing member is attached is stationary and not officially parked.

11. An apparatus for preserving spacing around a vehicle, the apparatus comprising:
   a processor; and
   a non-transitory computer-readable storage medium comprising computer executable instructions that, when executed by the processor, cause the apparatus to:
   cause a first end portion of a load bearing member to be moved to a predetermined position based on a received instruction indicative of a preset parking scenario stored in the non-transitory computer-readable storage medium, wherein the load bearing member is configured to be attached to the vehicle, the predetermined position is one of a first preset position stored in the non-transitory computer-readable storage medium for a first parking scenario or a second preset position stored in the non-transitory computer-readable storage medium for a second parking scenario different from the first parking scenario, at least one of the first preset position or the second preset position is different from a fully extended position of the first end portion of the load bearing member and a fully retracted position of the first end portion of the load bearing member, and the fully extended position is outside the vehicle when the load bearing member is attached to the vehicle.

12. The apparatus of claim 11, wherein the apparatus is further caused to:

collect data related to distance determination by way of a sensor;

process the collected data to determine one or more of (1) the presence of an obstruction, (2) a distance between the first end portion of the load bearing member and the determined obstruction, or (3) an absence of an obstruction based on the data collected by the sensor, and modify the predetermined position based on one or more of the determined distance between the first end portion of the load bearing member and the determined obstruction, the determined absence of an obstruction, or a user preference.

13. The apparatus of claim 11, wherein the apparatus is further caused to:

cause the first end portion of the load bearing member to be moved to the predetermined position based on a received instruction indicative of a preset lifestyle attachment function stored in the non-transitory computer-readable storage medium, the received instruction indicative of a preset lifestyle attachment function corresponding to whether a bicycle rack, a seat, a table, a grill, a storage container, or a tent is to be attached to the load bearing member.

14. The apparatus of claim 13, wherein the load bearing member is one of a plurality of load bearing members, and the apparatus is further caused to:

individually control movement of each load bearing member of the plurality of load bearing members based on the instruction indicative of the preset lifestyle attachment function, wherein each load bearing member of the plurality of load bearing members has a corresponding preset position for the preset lifestyle attachment function.

15. The apparatus of claim 11, wherein the first parking scenario is based on an identified type of parking space within which the vehicle to which the load bearing member is attached is parked and the second parking scenario is based on a determination that the vehicle to which the load bearing member is attached is stationary and not officially parked.

16. The apparatus of claim 11, wherein the load bearing member is one of a plurality of load bearing members, and the apparatus is further caused to:

individually control movement of each load bearing member of the plurality of load bearing members, wherein each load bearing member of the plurality of load bearing members has a corresponding preset position for the first parking scenario and the second parking scenario.

17. A method of preserving spacing around a vehicle, the method comprising:

causing, by a processor, in response to a received first instruction indicative of a preset parking scenario stored in a non-transitory computer-readable storage medium, a load bearing member having a first end portion and a second end portion distal the first end portion to be moved to a predetermined position within a range that includes a fully retracted position and a fully extended position, wherein the load bearing member is configured to be attached to the vehicle and the fully extended position is outside the vehicle when the load bearing member is attached to the vehicle, the predetermined position is one of a first preset position stored in the non-transitory computer-readable storage medium for a first parking scenario or a second preset position stored in the non-transitory computer-readable storage medium for a second parking scenario different from the first parking scenario, and at least one of the first preset position or the second preset position is different from the fully extended position and the fully retracted position.

18. The method of claim 17, further comprising:

causing, at least in part, a sensor to collect data related to distance determination;

processing the data collected by the sensor to determine one or more of (1) a presence of an obstruction, (2) a distance between the first end portion of the load bearing member and the determined obstruction, or (3) an absence of an obstruction; and causing, at least in part, the predetermined position to be modified based on one or more of the determined distance between the first end portion of the load bearing member and the determined obstruction, the determined absence of an obstruction, or a user preference.

19. The method of claim 18, further comprising:

causing, at least in part, the first end portion of the load bearing member to be moved to the predetermined position based on a received second instruction indicative of a preset lifestyle attachment function stored in the non-transitory computer-readable storage medium, the received second instruction corresponding to whether a bicycle rack, a seat, a table, a grill, a storage container, or a tent is to be attached to the load bearing member.

20. The method of claim 17, wherein the first parking scenario is based on an identified type of parking space within which the vehicle to which the load bearing member is attached is parked, and the second parking scenario is based on a determination that the vehicle to which the load bearing member is attached is stationary and not officially parked.

* * * * *